3,645,891
SEPARATION OF METAL COMPOUNDS
Alan Goldup, Weybridge, Michael Thomas Westaway, Ottershaw, and Geoffrey Walker, Woking, England, assignors to The British Petroleum Company Limited, London, England
Filed Oct. 22, 1969, Ser. No. 868,551
Claims priority, application Great Britain, Oct. 29, 1968, 51,232/68
Int. Cl. B01d 13/00
U.S. Cl. 210—23                      15 Claims

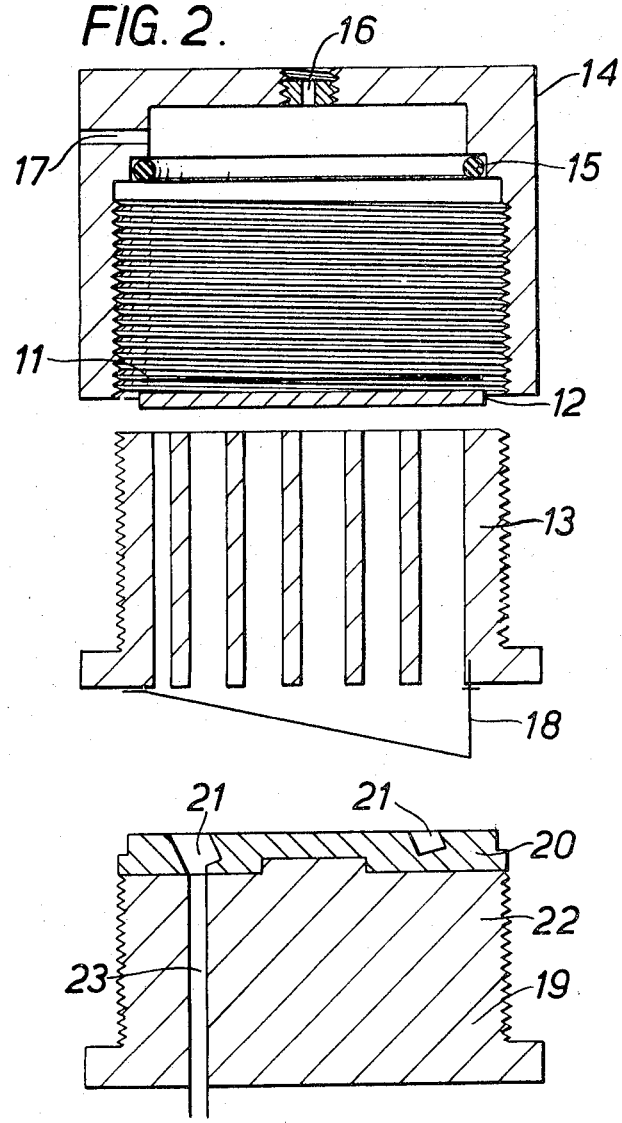

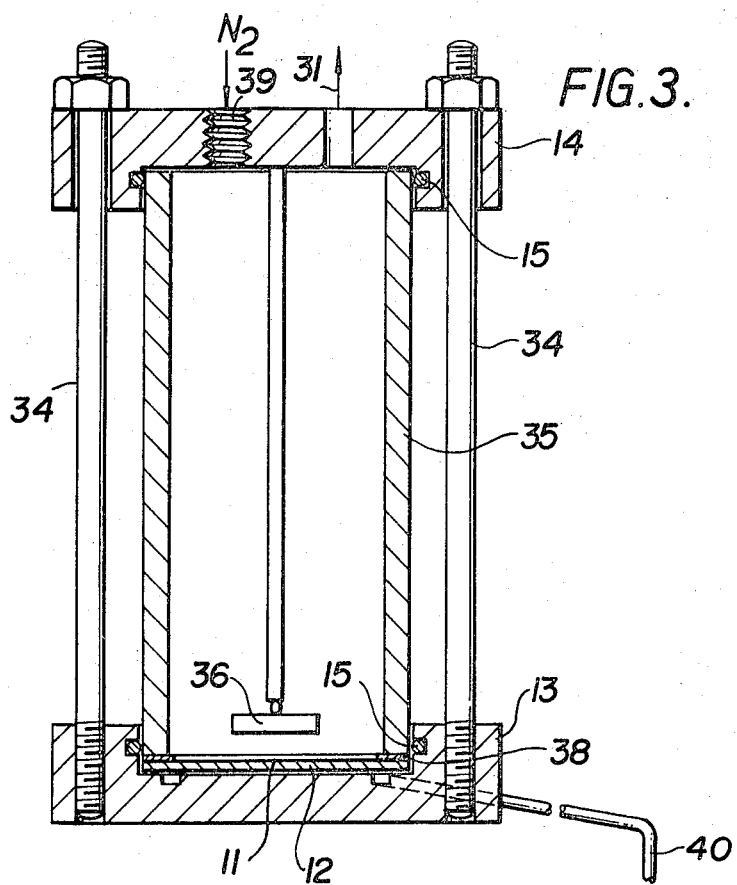

ABSTRACT OF THE DISCLOSURE

An organometallic compound of a metal of Group VIII or VII–A or V–A of the Periodic Table according to Mendeleef is separated from a solution of the compound in an organic component, by bringing the solution into contact with one side of a silicone rubber membrane at an applied pressure greater than the pressure on the opposite side of the membrane, the pressure differential being greater than the osmotic pressure of the system and the molecular cross section of the organometallic compound being greater than that of the organic component and collecting as a liquid the organic component which permeates the membrane, the permeate having a reduced content of the organometallic compound.

---

This invention relates to methods of separating organometallic compounds from solutions in non aqueous solvents.

It is frequently desirable to separate organometallic compounds from organic liquids. A particular example of this is when such compounds are used as catalysts in homogeneous catalysis. In some cases the reaction product containing catalyst is thermally unstable so hot separation by methods such as distillation may be inapplicable. Furthermore organometallic compounds are frequently very expensive and recovery by a method that does not result in degradation is particularly desirable.

Copending British application No. 12,173/68 corresponding to U.S. application Ser. No. 805,336, filed Mar. 7, 1969, discloses a process for the separation of a transition metal complex from a homogeneous fluid mixture of the complex, which comprises bringing the mixture into contact with one side of a cellulosic membrane at an applied pressure greater than the pressure on the opposite side of the membrane, the pressure differential being greater than the osmotic pressure of the system.

We have now found that separation may be achieved by using a silicone rubber membrane.

Thus according to the present invention there is provided a process for the separation of an organometallic compound of a metal of Group VII or VII–A or V–A of the Periodic Table according to Mandeleef from a solution of the compound in an organic component, which comprises bringing the solution into contact with one side of a silicone rubber membrane at an applied pressure greater than the pressure on the opposite side of the membrane, the pressure differential being greater than the osmotic pressure of the system and the molecular cross section of the organometallic compound being greater than that of the organic component and collecting as a liquid the organic component which permeates the membrane, the permeate having a reduced content of the organometallic compound.

The invention also comprises a continuous process of homogeneous catalysis which comprises reacting a hydrocarbon component and, optionally another organic component, hydrogen, and carbon oxides in the presence of a co-ordination complex of a transition metal in which is produced a solution of the co-ordination complex in the liquid reaction mixture and separating the co-ordination complex from the reaction mixture as hereinbefore described.

The membrane can be external to the reaction zone, for example where the conditions of separation, for example temperature and/or pressure, differ from those of the reaction. Further, one or more separation steps other than membrane separation can exist between the reaction zone and a membrane separation step external to it.

By the term "organometallic compound" we mean those compounds which contain a metal and an organic moiety. The term is not limited to components containing a metal to carbon bond. The metal may be a transition metal e.g. nickel, rhodium or vanadium or a non-transition metal e.g. aluminium.

"Organic components" referred to herebefore means compounds containing carbon and hydrogen which may in addition contain any of oxygen, nitrogen, sulphur and phosphorus, for example, alcohols, aldehydes, ketones, organic acids, amines and phosphines.

Typical organic components from which the organometallic compounds may be separated are heptaldehyde, toluene, benzene, xylene, n-hexane, n-heptane, butanol, isopropyl alcohol, butylamine, thiophene etc. In general the silicone rubber membranes have been found to be more permeable to non-polar solvents e.g. hydrocarbons, than to polar solvents e.g. alcohols, of comparable molecular weight and size.

The process of the present invention is particularly suitable for the separation of transition metal co-ordination complexes from their solutions in organic solvents, for example the separation of rhodium complexes from the reaction mixture resulting from the hydroformylation of olefins.

Thus the processes of the present invention can be employed in systems in which the organic components are alkenes having up to 20 carbon atoms per molecule and preferably 5 or lesss carbon atoms per molecule, in which hydrogen and/or carbon monoxide or carbon dioxide may be present and in which the transition metal complex contains one or more of metals of Groups VIII, V–A and Group VII–A of the Periodic Table according to Mendeleef. The complex may also contain at least one biphyllic ligand and a bidentate ligand co-ordinating through at least one oxygen atom. Thus, for example, a suitable mixture comprises the reaction product of the hydroformylation of a lower olefin in the presence of carbon monoxide and hydrogen, a typical catalyst is a rhodium complex in which the biphyllic moiety is tri n-butyl phosphine and the bidentate moiety is acetylacetonate i.e. $Rh(Bu_3P)CO(ACAC)$. The products from this reaction are alcohols and/or aldehydes, depending on the catalyst concentration, and the reaction is further discussed in copending U.K. patent application No. 55,295/67, corresponding to U.S. application Ser. No. 779,433, filed Nov. 28, 1968. Another suitable system is that in which a lower olefin is dimerised in the presence of a nickel acetylacetonate complex promoted by aluminium diethylethoxide.

Other typical rhodium complexes which can be separated from solution in organic components are

$Rh(Bu_3P)_2CO$

Propionate, $Rh(Et_3P)_2COCl$, $Rh(iPr_3P)_2COCl$ and

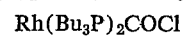
$Rh(Bu_3P)_2COCl$ where iPr is an isopropyl and Bu a n-butyl radical.

The membranes may also be used to separate nickel and vanadium containing complexes, for example, the etio porphyrins, from hydrocarbon solvents such as toluene.

The silicone rubber membrane may be prepared by methods known in the art. The thickness of the membrane is as low as possible consistent with the membrane having sufficient strength to withstand the applied pressure. The thickness may be from 0.0005 to 0.015 in. Preferably the thickness is in the range 0.001 to 0.005 in.

The membrane can, but need not necessarily be in the form of a disc. It should be in a form suitable to withstand the operating conditions to which it is subjected, particularly elevated pressure. To obtain a high output the maximum possible surface area of the membrane that can be achieved should be exposed to the components to be separated. Before use the membrane is preferably pretreated by soaking in the feedstock to be separated.

Operating conditions in the processes of the invention will depend mainly on the nature and method of conditioning of the membrane and also on the components to be separated. The main operating variables, however, are pressure, temperature and complex concentration. Separation is believed to arise because small oragnic components can diffuse through the labyrinth structure of silicone rubber membrane more readily than the bulky and possibly more rigid organometallic compounds. Accordingly the best separations are achieved when the organometallic compound is large and bulky compared to organic component. Thus the minimum cross section of the molecule of the organometallic compound should be greater than that of the organic compound and should desirably be greater than 8 A. preferably greater than 10 A. The larger the difference in size then the better is the separation, desirably the cross section of the organometallic compound is at least 50% greater than that of the organic components. Preferably, also the molecule of the organometallic compound is more rigid than that of the organic compound.

The applied pressure may be in the range from just greater than the osmotic pressure of the system to about 4000 p.s.i.g. Suitably the applied pressure is in the range 100 to 2500 p.s.i.g., preferably 500 to 2500 p.s.i.g.

Suitable operating temperatures are in the range 0 to 200° C. Preferred temperatures are in the range 20 to 100° C.

The concentration of the organometallic compound may be very low e.g. about 1 p.p.m. especially when used as a homogeneous catalyst or fairly high e.g. 10% by wt. A typical upper limit is about 5% by wt. Preferably the concentration is in the range 1 to 1000 parts per million by wt.

In the separation of rhodium complexes from hydroformylation products, temperatures up to about 150° C. and concentrations up to 1% by wt. are preferred.

The present invention is illustrated with reference to the flow system and apparatus described in the accompanying drawings, in which;

FIG. 2 shows in side elevation, and in expanded section the high pressure cell.

FIG. 3 shows another high pressure cell.

Figure 1:
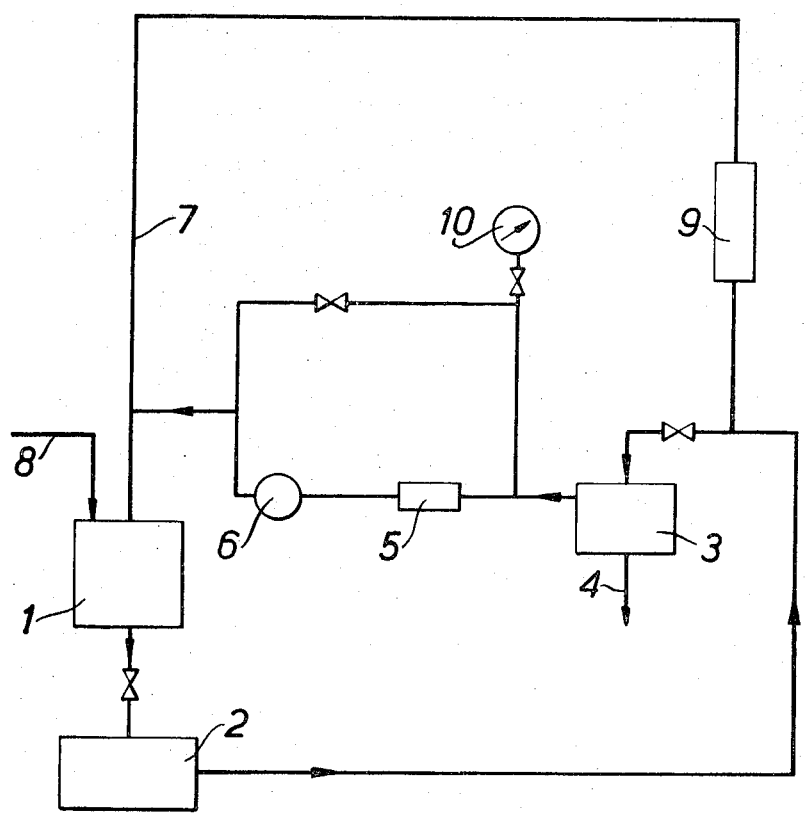
FIG. 1 shows schematically the high pressure flow system used.

In FIG. 1 feedstock was supplied from a reservoir 1 at atmospheric pressure, to which dry nitrogen could be supplied if necessary via line 8. The feedstock was pressurised by means of a hydraulic diaphragm pump 2 and supplied to the cell 3. Permeated material left the cell to collection via line 4. Non-permeated material returned to the reservoir 1 via a felt filter 5 and a pressure control valve 6. A cell by-pass line 7 was provided containing a pressure relief valve 9 operating at 3000 p.s.i.g. Pressures were read from gauge 10.

In FIG. 2 a membrane 11 diameter 7.0 cm., was supported on a sintered stainless steel disc 12, of pore size 6 microns, which in turn rested on a stainless steel head 14 the membrane was sealed against nitrile rubber O-rings 15. Feedstock entered the cell through 1 mm. orifice 16 so as to create turbulence, and left the cell via outlet 17. The permeated material was collected in vessel 18.

The capacity of the cell above the membrane was 3.5 ml. Other methods of mixing than that referred to above may be used in a cell such as is described, for example a magnetic stirrer may be employed. Pressurisation may also be carried out by other means than are described, for example by using nitrogen.

In FIG. 3 a 150 ml. stainless steel, nitrogen pressured cell comprises three parts, top plate 14 and base plate 13 and barrel 35 held together by four rods 34. The membrane 11 having a permeable area of 11.4 cm.² is supported on a sintered stainless steel disc of pore size 6 microns seated in the base plate 13. The seal between the membrane 11 and the barrel 35 is made with 1 mm. Teflon gasket 38 and between plates 14 and 13 and barrel 35 by nitrile O rings 15. The top plate 14 contains a relief valve opening 31 and a connector opening 39 to the nitrogen supply. Turbulence in the cell is maintained by magnetic stirrer 36 and permeated material is drained through the outlet 40.

The flow system and apparatus described were used to investigate the separation of a catalyst complex from its reaction mixture, and conditions and the results obtained are given in the following examples. In these investigations rates of permeation (PR) were determined by measuring the volume of permeate collected over known periods of time. The metal contents of the permeates and feedstocks were measured by X-ray emission so that the resistance of the membrane to catalyst permeation could be expressed in terms of catalyst retention (CR), where CR was the ratio, expressed as a percentage, of the difference between the metal content of the feedstock and the permeate to the metal content of the feedstock.

EXAMPLES 1 TO 5

Silicone rubber membranes obtained from Bell Medical Products Ltd., of Slough Buckinghamshire, England were used to separate Rh(Bu₃P)CO ACAC where ACAC is acetylacetonate from mixtures obtained from the hydroformylation of propylene in which the reaction conditions were 120° C. and 800 p.s.i.g. The first mixture, designated light ends (LE) was the depropenised reaction product. The second mixture designated heavy ends (HE) was the light ends from which the low boiling components (boiling below 120° C.) had been removed by vacuum distillation and rotary ilm evapouration. The heavy ends comprised 1–2% of the light ends.

The separation was carried out in the apparatus described in the accompanying drawings using silicone rubber membranes of diameter 45 and 75 mm.

EXAMPLE 1

Results are shown in Tables 1 and 2 for feeds containing the rhodium complex dissolved in light ends and heavy ends respectively.

TABLE 1

Feed:
 Light ends
  Cat. conc.:
   430–680 p.p.m. for 1
   1028–1060 p.p.m. for 2
  Temperature 23 to 25° C.
Apparatus: Figs. 1 and 2

| Membrane | Pressure, p.s.i.g. | PR, gals/day/ft.² | Percent CR |
|---|---|---|---|
| 1 [1] | 250 | 3.02 | 59–60 |
|  | 500 | 3.92 | 70–71 |
|  | 1,000 | 4.72 | 81 |
|  | 1,500 | 4.97 | 83–85 |
|  | 2,000 | 4.97 | 85–86 |
| 2 [2] | 2,525 | 4.46 | 78 |
|  | 2,025 | 4.46 | 78 |
|  | 1,500 | 4.17 | 76 |
|  | 1,000 | 3.77 | 74 |
|  | 500 | 3.77 | 68 |

[1] Thickness of membrane 0.00425 in.
[2] Thickness of membrane 0.005 in.

TABLE 2

Feed: Heavy ends

| Membrane | Feed | Cat. conc., p.p.m. | Cell | Pressure, p.s.i.g. | PR, gals./day/ft.² | Percent CR |
|---|---|---|---|---|---|---|
| 3 | HE 1 | 11,000 | Figs. 1 and 2 | 1,500 | 0.2 | 84 |
| 4 | HE 2 | 2,820 | Fig. 3 | 90 | 0.09 | 52–60 |
| 5 | HE 2 | 2,820 | Figs. 1 and 2 | 1,500 | 0.39 | 93 |
| 6 | HE 3 | 924 | Fig. 3 | 400 | 0.06 | 60 |

The membranes 3 and 4 were stated by Bell Medical Products to have thickness from 0.005 to 0.008 in.

Membrane 5 was 0.0112 in. and membrane 6 0.004 in. in thickness.

EXAMPLE 2

This example demonstrates the effect of toluene and light ends dilution on the permeation of heavy ends. Results are recorded in Table 3.

TABLE 3

Apparatus: Figs. 1 and 2 (membrane 7), Fig. 3 (membrane 8)
Temp.: 22° C.

| Membrane | Heavy ends | Cat. Conc., p.p.m. | Pressure, p.s.i.g. | Dilution | Kin. visc. cs. | Av. overall PR gals./day/ft.² | PR of HE gals./day/ft.² | Percent CR |
|---|---|---|---|---|---|---|---|---|
| 7[1] | HE 2 | 2,908 | 1,500 | [2] 0.6 | 2.43 | 0.38 | 0.38 | 93 |
|  |  | 2,800 |  | [2] 8.8 | 2.06 | 0.48 | 0.43 | 92 |
|  |  | 2,696 |  | [2] 16.1 | 1.80 | 0.59 | 0.46 | 91 |
|  |  | 2,440 |  | [2] 20.6 | 1.55 | 0.66 | 0.46 | 91 |
| 8[3] | HE 3 | 924 | 400 | [4] 0 | 11.50 | 0.056 | 0.056 | 59 |
|  |  | 872 |  | [4] 10 | 6.97 | 0.090 | 0.081 | 42 |
|  |  | 728 |  | [4] 20 | 5.06 | 0.161 | 0.128 | 47 |
|  |  | 644 |  | [4] 31 | 3.33 | 0.198 | 0.136 | 59 |

[1] Thickness 0.0112 in.
[2] Percent wt. toluene.
[3] Thickness 0.004 in.
[4] Percent vol. LE.

EXAMPLE 3

This example shows the effect of increasing temperature on catalyst separation from heavy ends (HE2). The results are recorded in Table 4.

TABLE 4

Apparatus: Fig. 3.
Press: 90 p.s.i.g.
Thickness of membrane stated by Bell Medical Products to be from 0.005 to 0.008 in.

| Membrane | Temp., °C. | Kin. visc. cs. | PR, gal./day/ft.² | Percent CR |
|---|---|---|---|---|
| 9 | 24 | 2.4 | 0.055 | 52.5 |
|  | 50 | 1.4 | 0.13 | 45.0 |
|  | 80 | 0.9 | 0.22 | 41.5 |

EXAMPLE 4

This example shows the effect of membrane thickness and reversal on permeation rate and catalyst retention. The results are recorded in Table 5.

TABLE 5

Feed: Toluene/Rh CO(Bu₃P) ACAC of concentration 720–840 p.p.m.
Temp.: 23° C.
Apparatus: Figs. 1 and 2 or Fig. 3.

| Membrane | Average thickness, inches | Pressure, p.s.i.g. | PR, gal./day/ft.² | Percent CR |
|---|---|---|---|---|
| 10 | 0.0032 |  | 2.61 | 62 |
| 11 | 0.0056 |  | 1.57 | 63 |
| 11 (reversed) | 0.0056 | 90 | 1.45 | 66 |
| 12 | 0.0116 | (¹) | 0.72 | 62 |
| 12 (reversed) | 0.0116 |  | 0.71 | 64 |
| 13 | 0.0050 | 500 | 4.46 | 82 |
| 13 (reversed) | 0.0050 |  | 4.43 | 80 |
| 14 | 0.0082 | (²) | 2.84 | 84 |
| 15 | 0.0095 |  | 2.50 | 84.5 |
| 16 | 0.0120 |  | 1.96 | 83.5 |
| 13 | 0.0050 |  | 5.71 | 82 |
| 13 (reversed) | 0.0050 | 1000 | 5.68 | 85 |
| 14 | 0.0082 | (²) | 3.60 | 84 |
| 15 | 0.0095 |  | 3.26 | 87 |
| 16 | 0.0120 |  | 2.63 | 85 |
| 13 | 0.0050 |  | 6.61 | 82.5 |
| 14 | 0.0082 | 2000 | 4.18 | 85 |
| 16 | 0.0120 | (²) | 2.96 | 87 |

¹ Fig. 3.
² Fig. 2.

EXAMPLE 5

This example illustrates the separation of a typical hydroformylation catalyst from the reaction mixture.

Pressure—1500 p.s.i.g.
Feed—n-heptaldehyde/RhCO(Bu₃P) ACAC
Temp.—29° C.
Cell as FIG. 2

| Membrane | PR, gal./day/ft.² | Percent CR |
|---|---|---|
| 17 (membrane average thickness 0.0075 in.) | 1.5 | 88.5 |

We claim:

1. A process for the separation of an organometallic compound of a metal of Group VIII or VII–A or V–A of the Periodic Table according to Mendeleef from a solution of the compound in an organic component, which comprises bringing the solution having a concentration of organometallic compound from 1 p.p.m. to 10% by weight and at a temperature of from 0 to 200° C. into contact with one side of a silicone rubber membrane having a thickness of 0.0005 to 0.015 inch at an applied pressure up to 4000 p.s.i.g., the applied pressure being greater than the pressure on the opposite side of the membrane, the pressure differential being greater than the osmotic pressure of the system and the molecular cross section of the organometallic compound being greater than that of the organic component and collecting as a liquid the organic components which permeate the membrane, the permeate having a reduced content of organometallic compound.

2. A process as claimed in claim 1 wherein the thickness of the membrane is in the range 0.001 to 0.005 in.

3. A process as claimed in claim 1 wherein the applied pressure is in the range 500 to 2500 p.s.i.g.

4. A process as claimed in claim 1 wherein the concentration of organometallic compound is in the range 1 to 1000 p.p.m.

5. A process as claimed in claim 1 wherein the minimum cross section of the molecule of the organometallic compound is greater than 8 A.

6. A process as claimed in claim 1 wherein the membrane, before use, has been pretreated by soaking in the mixture to be separated.

7. A process as claimed in claim 1 wherein the organometallic compound is a transition metal co-ordination complex.

8. A process as claimed in claim 7 wherein the complex contains a metal of Group VIII or VII-A or V-A of the Periodic Table according to Mendeleef.

9. A process as claimed in claim 8 wherein the metal complex is nickel acetylacetonate or a nickel or vanadium etioporphyrin.

10. A process as claimed in claim 8 in which the metal complex is a rhodium complex.

11. A process as claimed in claim 10 wherein the metal complex is $Rh(Et_3P)_2COCl$, $Rh(iPr_3P)_2COCl$ or $$Rh(Bu_3P)_2COCl$$

where Et is an ethyl radical, iPr is an isopropyl radical and Bu is a n-butyl radical.

12. A process as claimed in claim 10 wherein the complex is $Rh(Bu_3P)CO(ACAC)$ or $Rh(Bu_3P)_2CO$ propionate where Bu represents n-butyl and ACAC is acetylacetonate.

13. A process as claimed in claim 1 wherein the mixture comprises alkenes having up to 20 carbon atoms per molecule.

14. A process as claimed in claim 1 wherein the mixture comprises the reaction product of the hydroformylation of a lower olefin in the presence of carbon monoxide and hydrogen.

15. A continuous process of homogeneous catalysis which comprises reacting a hydrocarbon in the presence of a co-ordination complex of a transition metal in which a solution of the co-ordination complex in the liquid reaction mixture is produced and separating the co-ordination complex from the reaction mixture by a process as claimed in claim 1.

References Cited

UNITED STATES PATENTS

| | | | |
|---|---|---|---|
| 2,913,507 | 11/1959 | Binning et al. | 260—683.74 X |
| 2,923,749 | 2/1960 | Lee et al. | 210—22 X |
| 3,228,876 | 1/1966 | Mahon | 210—321 X |
| 3,412,174 | 11/1968 | Kroll | 260—683.9 |

FRANK A. SPEAR, Jr., Primary Examiner

U.S. Cl. X.R.

210—500

UNITED STATES PATENT OFFICE
CERTIFICATE OF CORRECTION

Patent No. 3,645,891         Dated February 29, 1972

Inventor(s) Alan Goldup et al

It is certified that error appears in the above-identified patent and that said Letters Patent are hereby corrected as shown below:

Col. 1, Line 55,
for "Group VII"         read         -- Group VIII --

Col. 1, Line 56,
for "Mandeleef"         read         -- Mendeleef --

Col. 2, Line 17,
for "herebefore"        read         -- hereinbefore --

Col. 2, Line 52,
for "Rh(Bu$_3$P)CO(ACAC)"    read    -- Rh(Bu$_3$P)CO(acac) --

Col. 2, Line 64,
for "Rh(Bu$_3$P)$_2$CO"      read    -- Rh(Bu$_3$P)$_2$CO
                                        Propionate, --

Col. 2, Line 65,
omit "Propionate,"

Col. 4, Line 39,
for "ACAC", each        read         -- acac --
    occurrence,

UNITED STATES PATENT OFFICE
CERTIFICATE OF CORRECTION

Patent No. 3,645,891   Dated February 29, 1972

Inventor(s) Alan Goldup et al    PAGE - 2

It is certified that error appears in the above-identified patent and that said Letters Patent are hereby corrected as shown below:

Col. 4, TABLE 1 under col. headed "PR, gals/day/ft.$^2$",
for "4.46", second occurrence,  read  -- 4.34 --
for "3.77", second occurrence,  read  -- 3.09 --

Col. 4, TABLE 1 under col. headed "Percent CR",
for "78", second occurrence,  read  -- 76 --

Col. 5, TABLE 4 under col. headed "Percent CR",
for "45.0"  read  -- 45.5 --
for "41.5"  read  -- 41.0 --

Col. 6, Example 5, under col. headed "PR gals/day/ft.$^2$",
for "1,5"  read  -- 1.5 --

Col. 6, Claim 1, Line 5,
for "an"  read  -- a --

UNITED STATES PATENT OFFICE
CERTIFICATE OF CORRECTION

Patent No. 3,645,891      Dated February 29, 1972

Inventor(s) Alan Goldup et al      PAGE - 3

It is certified that error appears in the above-identified patent and that said Letters Patent are hereby corrected as shown below:

Col. 7, Claim 12,
Lines 2 and 3,
for "ACAC", both           read           -- acac --
    occurrences, Signed and sealed this 19th day of September 1972.

(SEAL)
Attest:

EDWARD M. FLETCHER, JR.                ROBERT GOTTSCHALK
Attesting Officer                      Commissioner of Patents